United States Patent
Kimura et al.

(10) Patent No.: US 7,352,756 B2
(45) Date of Patent: Apr. 1, 2008

(54) GATEWAY CARD, GATEWAY APPARATUS, GATEWAY CONTROL METHOD, AND COMPUTER PRODUCT

(75) Inventors: Masatoshi Kimura, Kawasaki (JP); Katsuyuki Nonaka, Kawasaki (JP); Shuichi Suzuki, Kawasaki (JP); Shigeo Sakuma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 874 days.

(21) Appl. No.: 10/652,165

(22) Filed: Sep. 2, 2003

(65) Prior Publication Data
US 2004/0208188 A1    Oct. 21, 2004

(30) Foreign Application Priority Data
Sep. 4, 2002    (JP) .............................. 2002-258685

(51) Int. Cl.
*H04L 12/28* (2006.01)
(52) U.S. Cl. ..................... 370/401; 370/230; 370/252
(58) Field of Classification Search ..................... None
See application file for complete search history.

(56) References Cited

U.S. PATENT DOCUMENTS 6,192,484 B1    2/2001    Asano

2003/0046580 A1*  3/2003  Taniguchi et al. .......... 713/200
2003/0065791 A1*  4/2003  Garg et al. .................. 709/229

FOREIGN PATENT DOCUMENTS

| JP | 6-301631 | 10/1994 |
| JP | 7-56694 | 3/1995 |
| JP | 10-254636 | 9/1998 |
| JP | 11-85412 | 3/1999 |
| JP | 11-249967 | 9/1999 |
| JP | 2000-285090 | 10/2000 |

\* cited by examiner

*Primary Examiner*—Duc Ho
(74) *Attorney, Agent, or Firm*—Westerman, Hattori, Daniels & Adrian, LLP.

(57) ABSTRACT

A gateway card includes an input-output interface detachably inserted into an insertion section of a personal computer provided with control authority, and a nonvolatile memory that stores control terminal authentication data such as data for a product name for authenticating the personal computer. The card also includes a system data setting section that receives a setting request for system data of the gateway card issued from a terminal and obtains terminal authentication data from the terminal. The system data setting section permits setting of the system data only if there is a match between the control terminal authentication data and the terminal authentication data as a result of comparison.

17 Claims, 9 Drawing Sheets

FIG.2

| D1 | PRODUCT NAME DATA | | | | SERIAL NUMBER DATA | | | |
|---|---|---|---|---|---|---|---|---|
| | PRODUCT NAME SYMBOL | PRODUCT NAME DATA LENGTH | PRODUCT NAME CHECKSUM | PRODUCT NAME | SERIAL NUMBER SYMBOL | SERIAL NUMBER DATA LENGTH | SERIAL NUMBER CHECKSUM | SERIAL NUMBER |
| | PRODUC | 1 BYTE | 0x30 | FJ-PC505 | SERNO | 1 BYTE | 0x20 | 390916 |

| PRODUCT NAME DATA | | | | SERIAL NUMBER DATA | | | |
|---|---|---|---|---|---|---|---|
| PRODUCT NAME SYMBOL | PRODUCT NAME DATA LENGTH | PRODUCT NAME CHECKSUM | PRODUCT NAME | SERIAL NUMBER SYMBOL | SERIAL NUMBER DATA LENGTH | SERIAL NUMBER CHECKSUM | SERIAL NUMBER |
| PRODUC | 1 BYTE | 0x30 | ZZZ-555 | SERNO | 1 BYTE | 0x20 | 451027 |

GATEWAY CARD, GATEWAY APPARATUS, GATEWAY CONTROL METHOD, AND COMPUTER PRODUCT

BACKGROUND OF THE INVENTION

1) Field of the Invention

The present invention relates to a technology for preventing setting of system data by a malicious third party and erroneous setting of system data.

2) Description of the Related Art

As well known, with popularization of the Internet, an Internet connection function is provided not only in a personal computer but also in various equipment such as a television and a telephone, thereby the Internet can be used in individual homes.

However, when a user newly purchases equipment having the Internet connection function, it is necessary to perform connection setting to an access point for connecting each equipment to the Internet so as to allow the respective equipment to access the Internet, but this setting requires time and energy.

Wiring for communication lines is necessary in individual houses for the equipment. This is also troublesome, causing a problem in that wiring becomes more complicated as the number of equipment is increased.

As one solution for these problems, a gateway apparatus referred to as a home gateway or the like is recently attracting attention. Such a gateway apparatus installed in each house allows a difference in communication protocols to be adjusted, which allows interconnection. More specifically, the communication protocols are for the domestic network and the external network such as the Internet.

The respective equipment that can use the Internet is connected to this gateway apparatus. The gateway apparatus can be connected to the Internet via a public telephone network.

If system data relating to the connection to the Internet is set by the gateway apparatus, the respective equipment connected to the gateway apparatus can access the Internet without performing connection setting to the Internet individually.

By installing the gateway apparatus, time and energy for connection setting and the like to the Internet can be saved, and wiring or the like in the house can be put together, thereby considerably increasing the convenience for users. As a result, it is expected that popularization of the equipment that can use the Internet be accelerated.

In most homes, however, it is almost impossible to expect an administrator having expertise in network equipment to control the gateway apparatus (home gateway).

Therefore, conventionally, ordinary users having no expertise perform the setting including initialization, modification, restoration, and storage of the system data.

In setting the system data, there is a need for creating such an environment that user convenience can be improved and erroneous setting can be prevented, while maintaining security so as to exclude setting by a third party with malicious intentions via the network.

However, the conventional gateway apparatus (home gateway) is targeted for an ordinary user, and therefore advanced operation for ensuring the security cannot be expected. Thus, it is difficult to satisfy such needs.

In view of these problems, the conventional gateway apparatus (home gateway) currently has many problems to be solved by the time when the gateway apparatus becomes widespread in respective homes.

SUMMARY OF THE INVENTION

It is an object of the present invention to solve at least the problems in the conventional technology.

A gateway card according to one aspect of the present invention is detachably inserted into a server information processor and controls communications between different networks. The gateway card includes a retention unit that retains first apparatus authentication data for authenticating the server information processor, and a setting request reception unit that receives a setting request for system data of the gateway card. The gateway card also includes a data obtaining unit that obtains second apparatus authentication data from either of a client information processor and the server information processor which has issued the setting request. The gateway card further includes a permission unit that compares the first apparatus authentication data with the second apparatus authentication data, and permits setting of the system data only if there is a match between both of the data as a result of the comparison.

A gateway control method according to another aspect of the present invention is used for a gateway card that is detachably inserted into a server information processor and controls communications between different networks. The method includes the steps of retaining first apparatus authentication data for authenticating the server information processor, and receiving a setting request for system data of the gateway card. The method also includes the step of obtaining second apparatus authentication data from either of a client information processor and the server information processor which has issued the setting request. The method further includes the steps of comparing the first apparatus authentication data with the second apparatus authentication data and permitting setting of the system data only if there is a match between both of the data as a result of the comparison.

A gateway apparatus according to still another aspect of the present invention performs communication control between different networks. The gateway apparatus includes a retention unit that retains first apparatus authentication data for authenticating the server information processor, and a setting request reception unit that receives a setting request for system data of the gateway apparatus. The gateway apparatus also includes a data obtaining unit that obtains second apparatus authentication data from either of a client information processor and the server information processor which has issued the setting request. The gateway apparatus further includes a permission unit that compares the first apparatus authentication data with the second apparatus authentication data, and permits setting of the system data only if there is a match between both of the data as a result of the comparison.

A gateway control method according to still another aspect of the present invention is used for controlling communications between different networks. The method includes the steps of retaining first apparatus authentication data for authenticating the server information processor, and receiving a setting request for system data of the gateway apparatus. The method also includes the step of obtaining second apparatus authentication data from either of a client information processor and the server information processor which has issued the setting request. The method further includes the steps of comparing the first apparatus authentication data with the second apparatus authentication data and permitting setting of the system data only if there is a match between both of the data as a result of the comparison.

A computer program according to still another aspect of the present invention controls communications between different networks. The computer program allows a computer to execute the steps of retaining first apparatus authentication data for authenticating the server information processor, and receiving a setting request for system data of the gateway apparatus. The computer program also allows the computer to execute the step of obtaining second apparatus authentication data from either of a client information processor and the server information processor which has issued the setting request. The computer program further allows the computer to execute the steps of comparing the first apparatus authentication data with the second apparatus authentication data and permitting setting of the system data only if there is a match between both of the data as a result of the comparison.

The other objects, features and advantages of the present invention are specifically set forth in or will become apparent from the following detailed descriptions of the invention when read in conjunction with the accompanying drawings.

DETAILED DESCRIPTION

Exemplary embodiments of the gateway card, the gateway apparatus, the gateway control method, and the computer program according to the present invention will be explained in detail with reference to the drawings.

Figure 1:
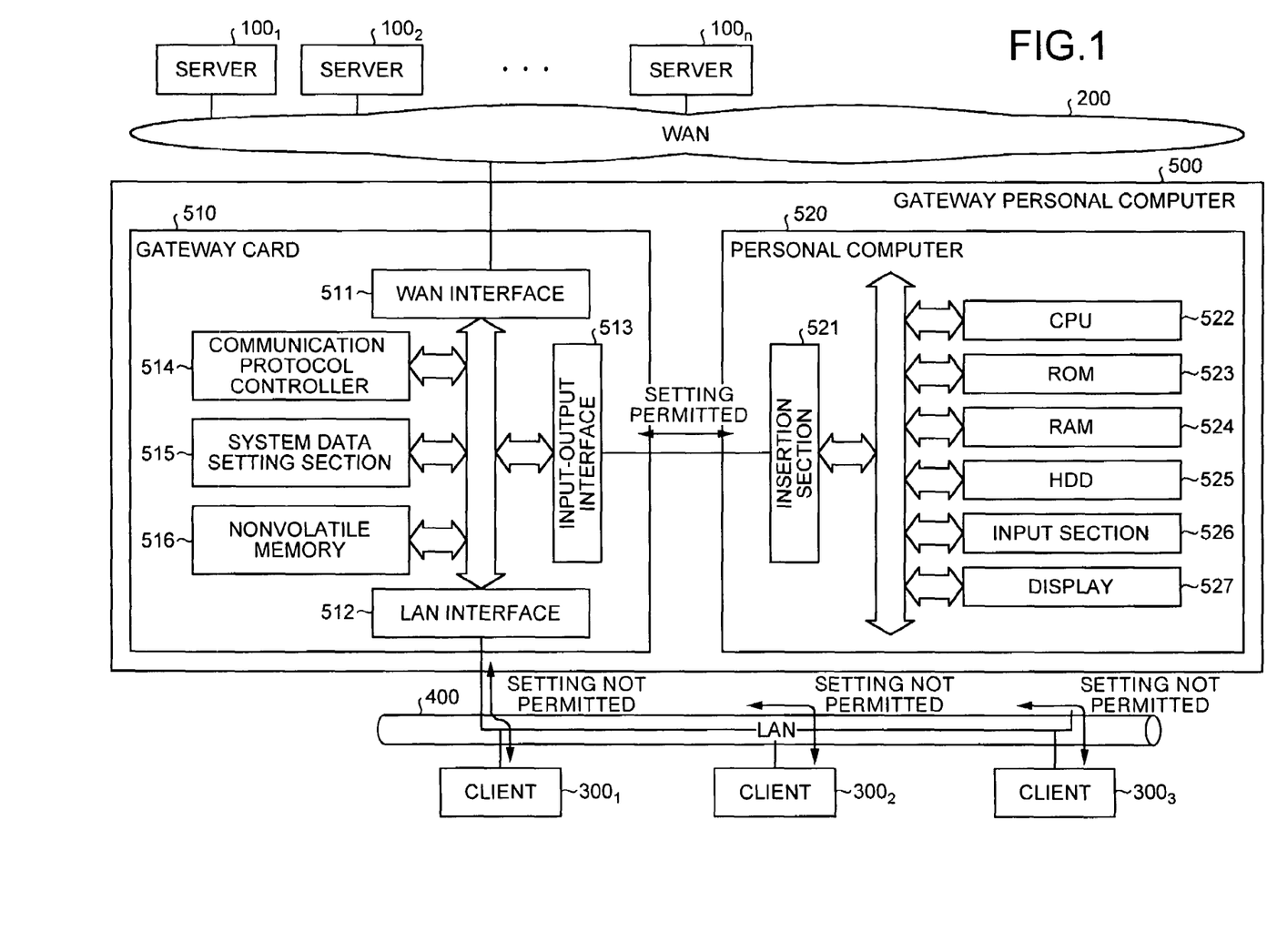
FIG. 1 is a block diagram of a configuration according to a first embodiment of the present invention.

FIG. 1 is a block diagram of the configuration according to a first embodiment of the present invention. This figure illustrates a communication system in which a Wide Area Network (WAN) 200 and a Local Area Network (LAN) 400 having different communication protocols and standards are connected to each other via a gateway personal computer 500.

The WAN 200 is a wide area network including the Internet, public telephone networks, radio communication networks, Cable Television (CATV) networks, and the like, and connects computers in remote areas with each other according to a predetermined communication protocol. Servers $100_1$ to $100_n$ are mail servers, World Wide Web (WWW) server, or the like, and are connected to the WAN 200.

These servers $100_1$ to $100_n$ provide mail service, WWW site service, and the like to clients $300_1$ to $300_3$ via a gateway personal computer 500 described later and the LAN 400.

The clients $300_1$ to $300_3$ are, for example, client information processors installed in houses as personal computers or electric appliances (television, telephone, audio equipment, etc.) having a network connection function.

These clients $300_1$ to $300_3$ are connected to the LAN 400 laid in the house, and have a function of receiving the various services by accessing the servers $100_1$ to $100_n$ via the LAN 400, the gateway personal computer 500, and the WAN 200.

In the WAN 200 and the LAN 400, different communication protocols are adopted respectively.

The gateway personal computer 500 is a dedicated personal computer that is installed, for example, at home, and that provides functions (for example, router function, bridge function, and the like) as a (home) gateway, and that is inserted between the WAN 200 and the LAN 400 having a different communication protocol from each other.

The gateway is a generic name of hardware or software for enabling interconnection by adjusting the difference in the communication protocol between the WAN 200 and the LAN 400.

The gateway personal computer 500 includes a gateway card 510 and a personal computer 520. The gateway card 510 is a card type gateway apparatus detachably inserted into an insertion section 521 of the personal computer 520, and provides the gateway function described above.

In using the gateway card 510, the system data must be set beforehand. When the gateway card 510 is to provide a router function, for example, the system data includes Internet Protocol (IP) address, Dynamic Host Configuration Protocol (DHCP) data, line data, filtering data, firmware, and the like.

Generally, at the time of shipping the gateway card 510 from the factory, the system data is initialized by default. The administrator of the gateway card 510 individually sets any necessary system data of the system data when the gateway card 510 is used.

The first embodiment is configured such that control authority as a server information processor (control terminal) is given to the personal computer 520 in the gateway personal computer 500 so that only the personal computer 520 can perform setting (including initialization, modification, restoration, and storage) of the system data, as described below.

Therefore, the clients $300_1$ to $300_3$ cannot perform setting of the system data for the gateway card 510.

In the gateway card 510, a WAN interface 511 is connected to the WAN 200, and becomes a communication interface between the WAN 200 and the gateway card 510. A LAN interface 512 is connected to the LAN 400, and becomes a communication interface between the LAN 400 and the gateway card 510.

An input-output interface 513 is detachably inserted into the insertion section 521 of the personal computer 520, and becomes an interface between the personal computer 520 and the gateway card 510.

The communication protocol controller 514 performs control for adjusting the difference in the communication protocol between the WAN 200 and the LAN 400, based on the set system data, thereby enabling interconnection.

The system data setting section 515 performs control related to the setting of the system data, based on a request for setting the system data from the personal computer 520 having the control authority.

The nonvolatile memory 516 is a rewritable read only memory that can electrically erase stored data without requiring a backup power source, such as a flash erasable programmable read only memory (EPROM).

Figure 2:
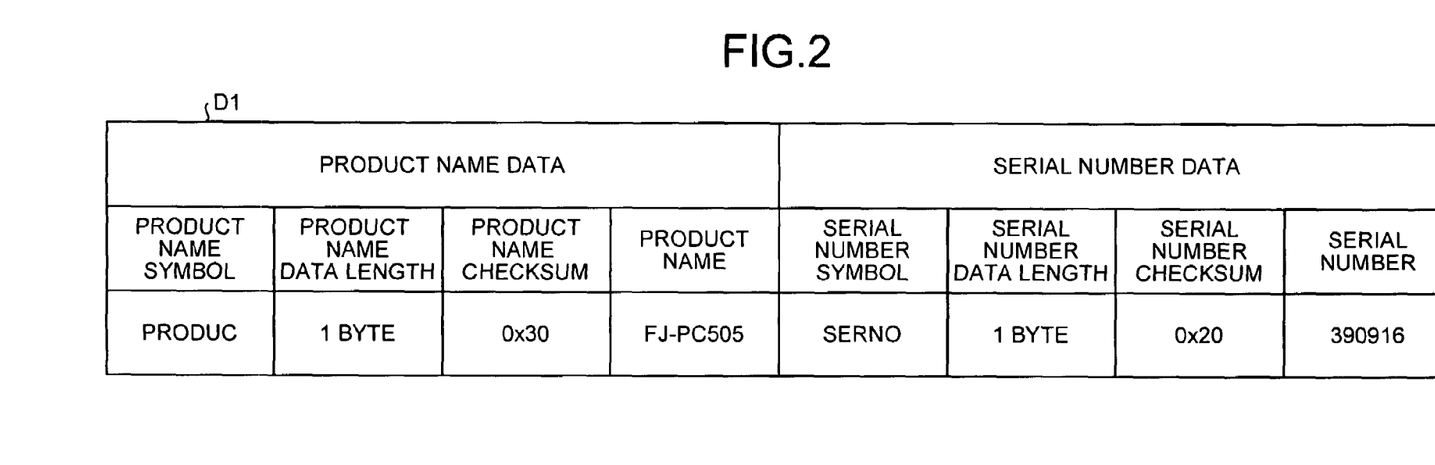
FIG. 2 is an illustration of terminal authentication data stored in a nonvolatile memory 516 shown in FIG. 1.

In this nonvolatile memory 516, not only the system data but also terminal authentication data D1 shown in FIG. 2 are stored. This terminal authentication data D1 is control terminal authentication data used when it is authenticated whether the terminal having issued the setting request of the system data is the authorized control terminal, and includes "data for a product name" and "data for a serial number".

The "data for a product name" is data relating to a product name for authenticating the personal computer 520 as the control terminal, and includes "product name symbol", "product name data length", "product name checksum", and "product name".

The "product name symbol" represents a symbol of the product name. The "product name data length" represents a length of the "product name data". The "product name checksum" is used for checking if there is an error in the transmitted product name data, and represents a total value of the "product name data". The "product name" is a product name (FJ-PC505) of the personal computer 520 as a control terminal.

The "serial number data" is data relating to a serial number for authenticating the personal computer 520 as the control terminal, and includes "serial number symbol", "serial number data length", "serial number checksum", and "serial number".

The "serial number symbol" represents a symbol of the serial number. The "serial number data length" represents a length of the "serial number data". The "serial number checksum" is used for checking if there is an error in the transmitted serial number data, and represents a total value of the "serial number data". The "serial number" is a serial number (390916) of the personal computer 520 as a control terminal.

Returning to FIG. 1, the personal computer 520 has a function as an ordinary personal computer. In the personal computer 520, the input-output interface 513 of the gateway card 510 is inserted into the insertion section 521. A central processing unit (CPU) 522 controls the respective sections in the personal computer 520.

A read only memory (ROM) 523 stores firmware executed by the CPU 522 and the terminal authentication data (see FIG. 2) corresponding to the personal computer 520.

A random access memory (RAM) 524 temporarily stores various data handled by the CPU 522. A hard disk drive (HDD) 525 is a large capacity storage, and stores the operating system and various application programs.

An input section 526 is a keyboard, a mouse, and the like, and is used for inputting various data. A display 527 is a cathode ray tube (CRT) or a liquid crystal display (LCD), and displays various screens and data under control of the CPU 522.

Figure 3:
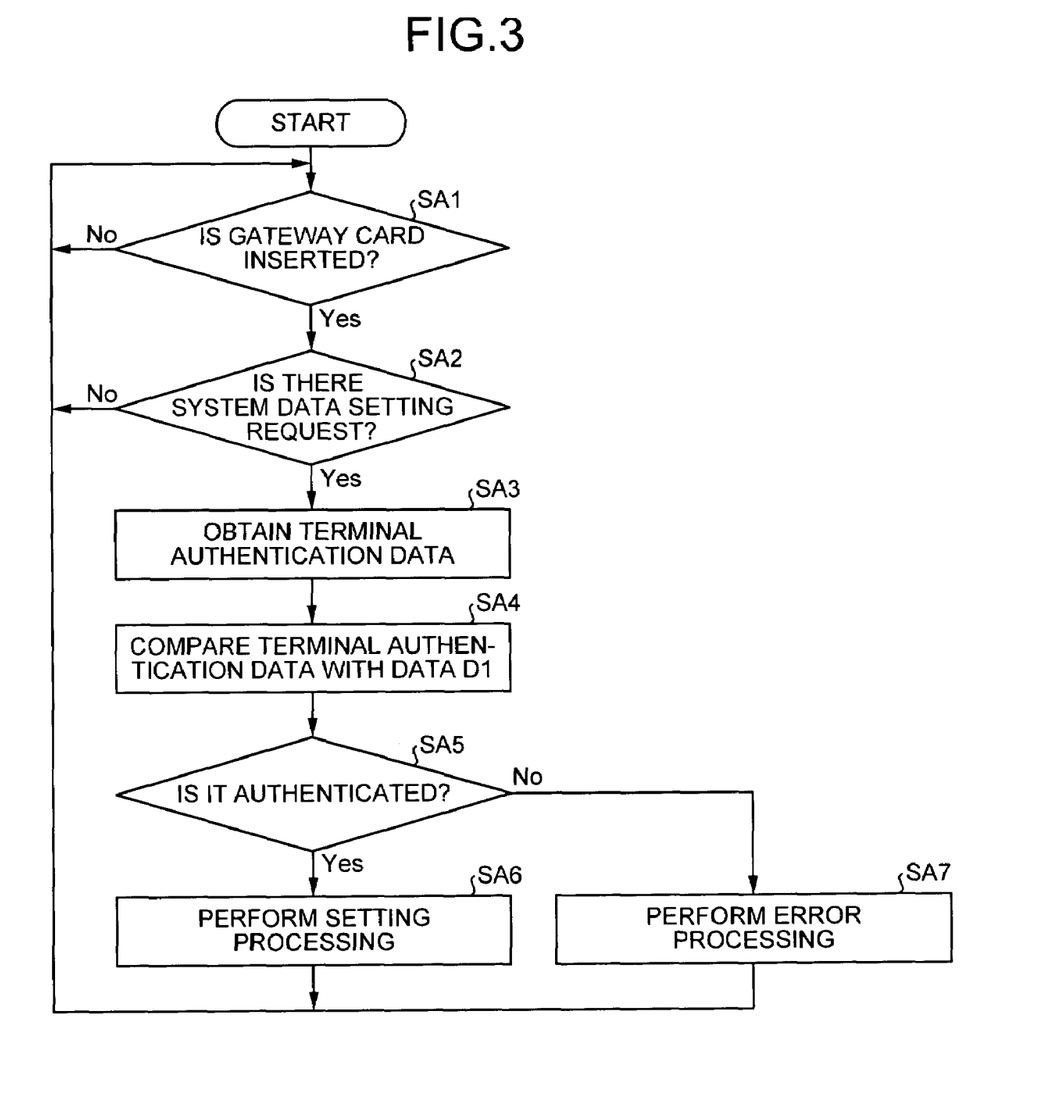
FIG. 3 is a flowchart of the operation of the first embodiment.

The operation of the first embodiment is now explained with reference to the flowchart shown in FIG. 3. An example of performing settings (including initialization, modification, restoration, and storage) of the system data for the gateway card 510 is explained below.

At step SA1, the system data setting section 515 determines whether the input-output interface 513 has been inserted into the insertion section 521. In this case, the system data setting section 515 determines that it has been inserted and makes a "Yes" determination. If the determination result at step SA1 is "No", the system data setting section 515 repeats the same processing of determination.

At step SA2, the system data setting section 515 determines whether there is a setting request for system data (including initialization, modification, restoration, and storage) in the gateway card 510, from an external terminal (in this case, the personal computer 520, and clients $300_1$ to $300_3$). In this case, the system data setting section 515 makes a "No" determination at step SA2 and performs the determination at step SA1 and step SA2.

The administrator inputs an instruction for setting the system data from the input section 526 of the personal computer 520. Thereby, the CPU 522 issues a setting request for system data ("system data setting request") to the system data setting section 515 via the insertion section 521 and the input-output interface 513.

As a result, the system data setting section 515 makes a "Yes" determination at step SA2. At step SA3, the system data setting section 515 requests terminal authentication data to the personal computer 520, and obtains the terminal authentication data stored in the ROM 523.

The terminal authentication data obtained from the personal computer 520 includes product name data (product name symbol, product name data length, product name checksum, and product name), and serial number data (serial number symbol, serial number data length, serial number checksum, and serial number).

At step SA4, the system data setting section 515 reads the terminal authentication data D1 (see FIG. 2) from the nonvolatile memory 516, and compares the terminal authentication data D1 with the terminal authentication data corresponding to the personal computer 520 obtained at step SA3.

At step SA5, the system data setting section 515 determines whether the personal computer 520 is authenticated as the control terminal provided with the control authority (whether there is a match between the data) based on the comparison result made at step SA4, and makes a "Yes" determination in this case.

At step SA6, the system data setting section 515 sets the system data (including initialization, modification, restoration, and storage) in the nonvolatile memory 516, corresponding to the system data setting request from the personal computer 520, and performs determination at step SA1.

When another user inputs an instruction for setting the system data from the input section (not shown) of the client $300_1$, the client $300_1$ issues a system data setting request to the system data setting section 515 via the LAN 400 and the LAN interface 512.

Thereby, the system data setting section 515 makes a "Yes" determination at step SA2. At step SA3, the system data setting section 515 requests the terminal authentication data to the client $300_1$ and obtains the terminal authentication data stored in the ROM (not shown).

The terminal authentication data obtained from the client $300_1$ includes product name data (product name symbol, product name data length, product name checksum, and product name), and serial number data (serial number symbol, serial number data length, serial number checksum, and serial number).

At step SA4, the system data setting section 515 reads the terminal authentication data D1 (see FIG. 2) from the nonvolatile memory 516, and compares the terminal authentication data D1 with the terminal authentication data corresponding to the client $300_1$ obtained at step SA3.

At step SA5, the system data setting section 515 determines whether the client $300_1$ is authenticated as the control terminal provided with the control authority (whether there is a match between the data) based on the comparison result made at step SA4. In this case, the system data setting section 515 determines that both pieces of the terminal authentication data fail to match as the comparison result, and makes a "No" determination at step SA5.

At step SA7, the system data setting section 515 performs error processing, that is, informs the client $300_1$ of "error" indicating that the setting is not permitted, and then performs the determination at step SA1. In other words, in this case, the client $300_1$ (also clients $300_2$ and $300_3$) does not have the control authority, and therefore the setting of the system data for the gateway card 510 is not permitted.

As explained above, according to the first embodiment, the system data setting section 515 permits setting of the system data under the following condition. That is, the setting of the system data is permitted only if the terminal authentication data D1 (see FIG. 2) previously stored in the nonvolatile memory 516 and the terminal authentication data obtained from a terminal having issued the system data setting request of the gateway card 510 match with each other as a result of comparison. As a result, even in the environment like home where an administrator having no expertise performs the setting, a change of setting due to operational error or misunderstanding, or setting of the system data by a malicious third party is prevented, thereby enabling improvement in the user convenience.

According to the first embodiment, only when the gateway card 510 is inserted into the insertion section 521 of the personal computer 520, permission is determined. Therefore, setting of the system data by a malicious third party via the network (WAN 200 or LAN 400) can be perfectly prevented in the state where the gateway card 510 is not inserted.

According to the first embodiment, since the terminal authentication data D1 (see FIG. 2) includes the product name data and the serial number data, setting of the system data by a malicious third party can be effectively prevented, even in the environment like home where an administrator has no expertise performs the setting.

According to the first embodiment, since it is most effective against invasion from outside, the setting of the gateway card 510 relating to the network 200 or the like can be maintained normal, and therefore safety can be increased by establishing the connection with the outside only when it is necessary. Further, setting becomes easy, and such an environment that the setting contents are hard to be destroyed can be constructed.

In the first embodiment, the example of the configuration is explained, in which the gateway personal computer 500 dedicated to the gateway is provided, and control authority is provided to the personal computer 520 in the gateway personal computer 500 to perform setting of the system data of the gateway card 510. However, the configuration may be such that the control authority is given to any one of the clients $300_1$ to $300_3$, to perform setting of the system data. This configuration example is explained below as a second embodiment.

Figure 4:
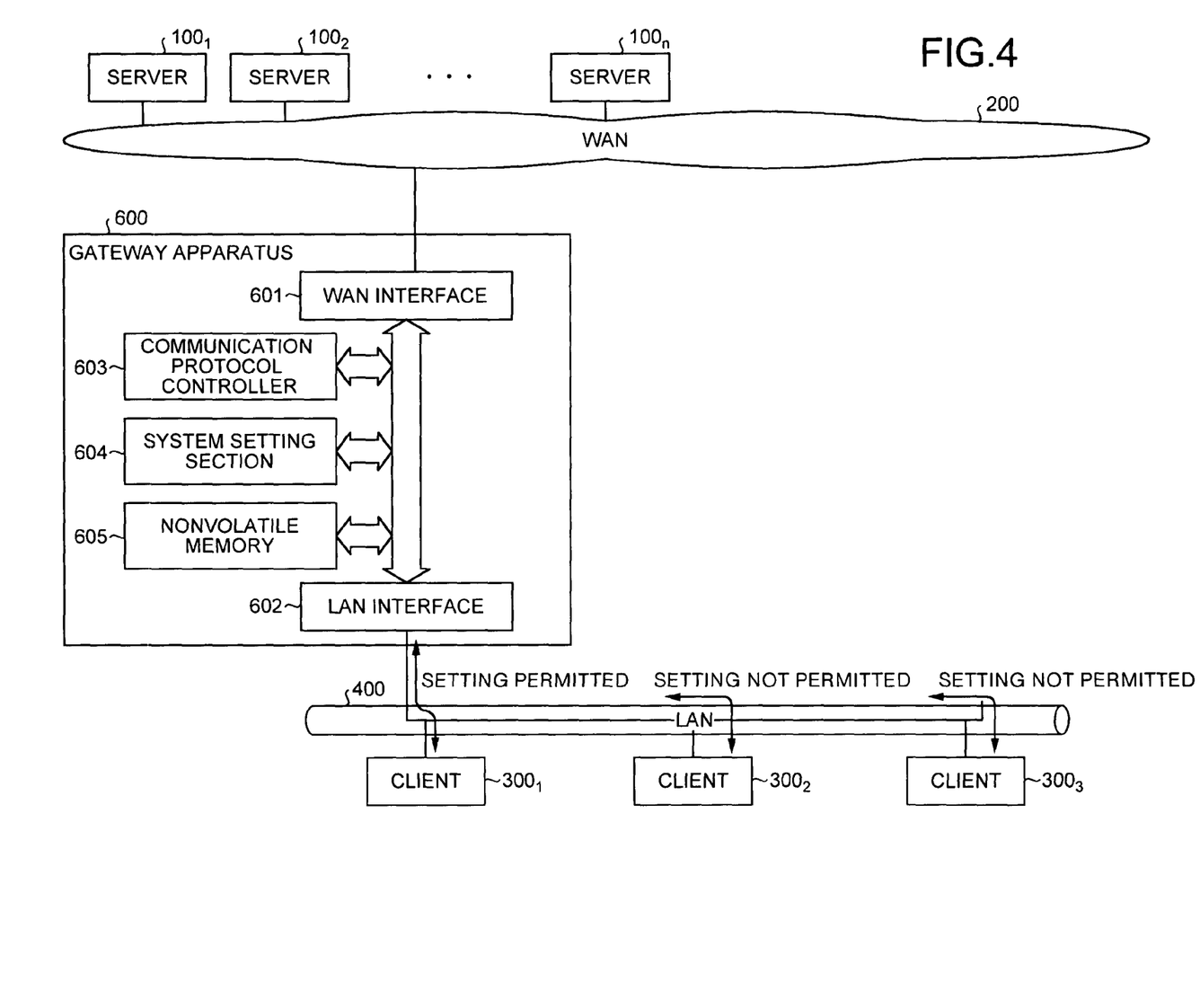
FIG. 4 is a block diagram of a configuration according to a second embodiment of the present invention.

FIG. 4 is a block diagram of the configuration according to the second embodiment of the present invention. In this figure, the parts corresponding to the respective sections in FIG. 1 are denoted by the same reference signs, and the explanation thereof is omitted.

In FIG. 4, a gateway apparatus 600 is provided instead of the gateway personal computer 500 shown in FIG. 1.

The gateway apparatus 600 is a gateway dedicated apparatus installed, for example, in home, that provides a function as a (home) gateway (for example, a router function, and a bridge function), and is inserted between the WAN 200 and the LAN 400 having a different communication protocol from each other.

The gateway apparatus 600 is an apparatus that enables interconnection by adjusting the difference in the communication protocol between the WAN 200 and the LAN 400.

In using the gateway apparatus 600, the system data explained in the first embodiment must be set. Generally, at the time of shipping the gateway apparatus 600 from the factory, the system data is initialized by default. The administrator of the gateway apparatus 600 individually sets any necessary system data of the system data, when using the gateway apparatus 600.

In the second embodiment, it is constructed such that control authority as a control terminal is given, for example, to the client $300_1$, of the clients $300_1$ to $300_3$ connected to the LAN 400 so that only the client $300_1$ can perform setting (including initialization, modification, restoration, and storage) of the system data.

In other words, the other clients $300_2$ and $300_3$ cannot perform setting of the system data for the gateway apparatus 600.

In the gateway apparatus 600, a WAN interface 601 is connected to the WAN 200 to serve as a communication interface between the WAN 200 and the gateway apparatus 600. A LAN interface 602 is connected to the LAN 400 to serve as a communication interface between the LAN 400 and the gateway apparatus 600.

A communication protocol controller 603 performs control for adjusting the difference in the communication protocol between the WAN 200 and the LAN 400, based on the set system data, thereby enabling interconnection.

A system data setting section 604 performs control relating to the setting of the system data, based on a request for setting system data ("system data setting request") from the client $300_1$ having the control authority.

A nonvolatile memory 605 is a rewritable read only memory that can electrically erase stored data, without requiring a backup power source, such as a flash EPROM.

Figure 5:
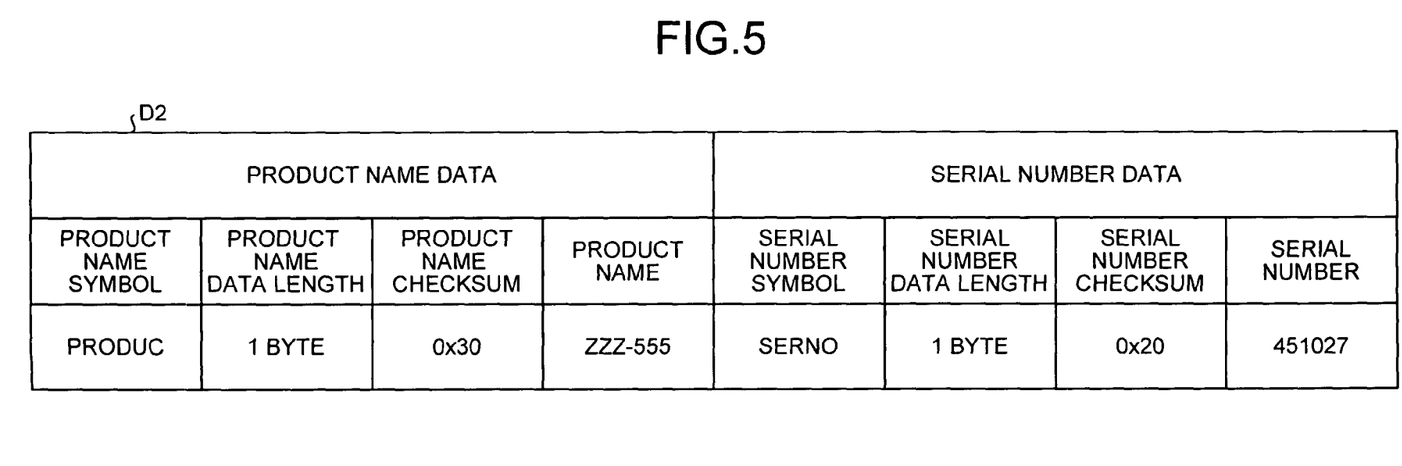
FIG. 5 is an illustration of terminal authentication data stored in a nonvolatile memory shown in FIG. 4 and FIG. 7.

In this nonvolatile memory 605, not only the system data described above, but also terminal authentication data D2 shown in FIG. 5 are stored. This terminal authentication data D2 is data used when it is authenticated whether the terminal having requested the setting of the system data is the authorized control terminal, and includes "product name data" and "serial number data".

The "product name data" is data relating to a product name for authenticating the client $300_1$ as the control terminal, and includes "product name symbol", "product name data length", "product name checksum", and "product name".

The "product name symbol", "product name data length", and "product name checksum" have the same meaning as those shown in FIG. 2. The "product name" is a product name (ZZZ-555) of the client $300_1$ as the control terminal.

The "serial number data" is data relating to a serial number for authenticating the client $300_1$ as the control terminal, and includes "serial number symbol", "serial number data length", "serial number checksum", and "serial number".

The "serial number symbol", "serial number data length", and "serial number checksum" correspond to the "serial number symbol", "serial number data length", and "serial number checksum" shown in FIG. 2.

The "serial number" is a serial number (451027) of the client $300_1$ as the control terminal.

The operation of the second embodiment is explained below with reference to the flowchart shown in FIG. 6. Hereinafter, an example in which setting (including initialization, modification, restoration, and storage) is performed relating to the system data of the gateway apparatus 600 is explained.

Figure 6:
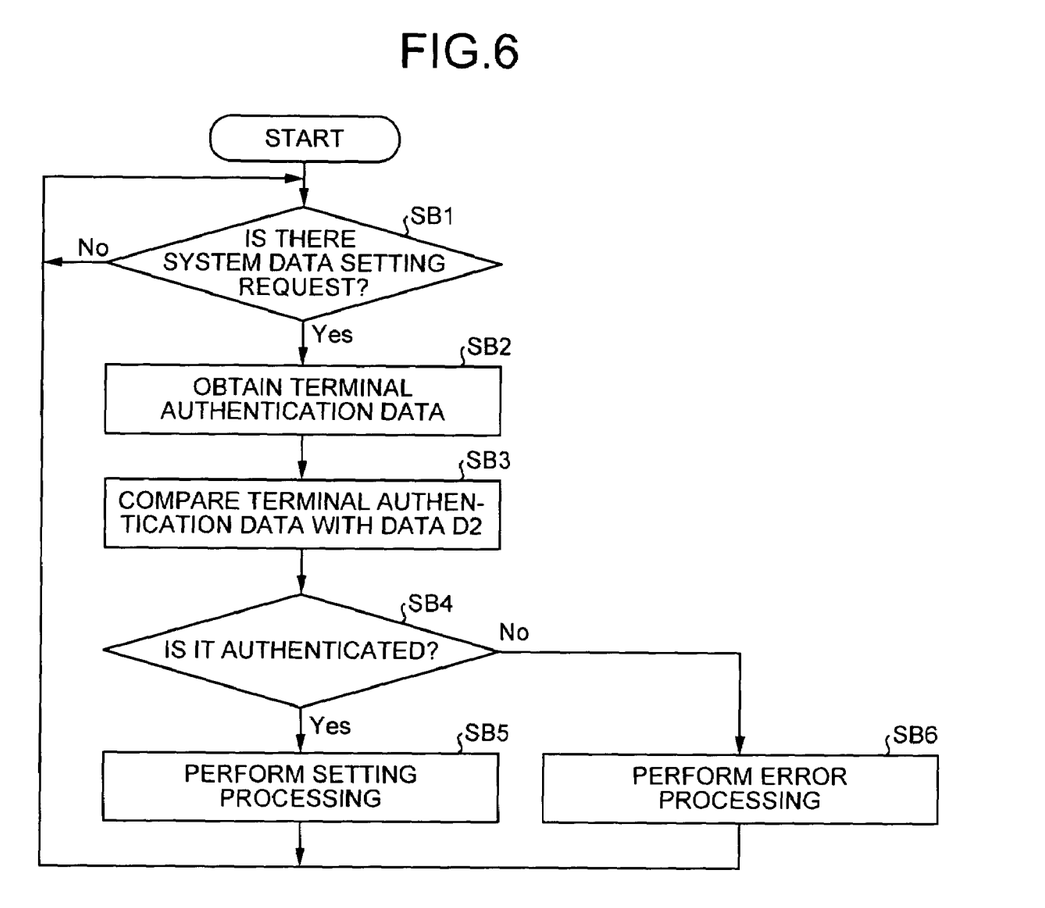
FIG. 6 is a flowchart of the operation of the second embodiment.

At step SB1 shown in FIG. 6, the system data setting section 604 determines whether a system data setting request (including initialization, modification, restoration, and storage) in the gateway apparatus 600 has been received from an external terminal (in this case, clients $300_1$ to $300_3$). In this case, the system data setting section 60 makes a "No" determination at step SB1, and repeats the same processing of determination.

The administrator inputs an instruction for setting the system data from the input section (not shown) of the client $300_1$. Thereby, the client $300_1$ issues a system data setting request to the system data setting section 604 in the gateway apparatus 600 via the LAN 400 and the LAN interface 602.

Accordingly, the system data setting section 604 makes a "Yes" determination at step SB1. At step SB2, the system data setting section 604 requests terminal authentication data to the client $300_1$ and obtains the terminal authentication data stored in the ROM (not shown).

The terminal authentication data obtained from the client $300_1$ includes product name data (product name symbol, product name data length, product name checksum, and product name), and serial number data (serial number symbol, serial number data length, serial number checksum, and serial number).

At step SB3, the system data setting section 604 reads the terminal authentication data D2 (see FIG. 5) from the nonvolatile memory 605, and compares the terminal authentication data D2 with the terminal authentication data corresponding to the client $300_1$ obtained at step SB2.

At step SB4, the system data setting section 604 determines whether the client $300_1$ is authenticated as the control terminal provided with the control authority (whether there is a match between the data) based on the comparison result made at step SB3, and makes a "Yes" determination in this case.

At step SB5, the system data setting section 604 sets the system data (including initialization, modification, restoration, and storage) in the nonvolatile memory 605 in response to the system data setting request from the client $300_1$ and performs determination at step SB1.

When another user inputs an instruction for setting the system data from the input section (not shown) of the client $300_2$, the client $300_2$ issues a system data setting request to the system data setting section 604 via the LAN 400 and the LAN interface 602.

Thereby, the system data setting section 604 makes a "Yes" determination at step SB1. At step SB2, the system data setting section 604 requests the terminal authentication data to the client $300_2$ and obtains the terminal authentication data stored in the ROM (not shown).

The terminal authentication data obtained from the client $300_2$ includes product name data (product name symbol, product name data length, product name checksum, and product name), and serial number data (serial number symbol, serial number data length, serial number checksum, and serial number).

At step SB3, the system data setting section 604 reads the terminal authentication data D2 (see FIG. 5) from the nonvolatile memory 605, and compares the terminal authentication data D2 with the terminal authentication data corresponding to the client $300_2$ obtained at step SB2.

At step SB4, the system data setting section 604 determines whether the client $300_2$ is authenticated as the control terminal provided with the control authority (whether there is a match between the data) based on the comparison result made at step SB3. In this case, the system data setting section 604 determines that both pieces of the terminal authentication data fail to match, and makes a "No" determination at step SB4.

At step SB6, the system data setting section 604 performs error processing, that is, informs the client $300_2$ of "error" indicating that the setting is not permitted, and then performs the determination at step SB1. In other words, in this case, the client $300_2$ (also client $300_3$) does not have the control authority, and therefore the system data setting section 604 does not permit the setting of the system data for the gateway apparatus 600.

As explained above, according to the second embodiment, the system data setting section 604 permits the setting of the system data, only if the terminal authentication data D2 (see FIG. 5) previously stored in the nonvolatile memory 605 and the terminal authentication data obtained from the terminal having issued the system data setting request of the gateway apparatus 600 match with each other as a result of comparison. Therefore, even in the environment like home where an administrator having no expertise performs the setting, a change of setting due to operational error or misunderstanding, or setting of the system data by a malicious third party is prevented, thereby enabling improvement in the user convenience.

In the second embodiment, the example of the configuration is explained, in which the system data is set in response to the setting request from the client $300_1$ provided with the control authority, only when the client $300_1$ is authenticated. However, the configuration may be such that a setting switch is provided on the gateway apparatus, the administrator presses the setting switch so as to confirm the decision making of the administrator, and then the system data is set. This configuration example is explained as a third embodiment.

Figure 7:
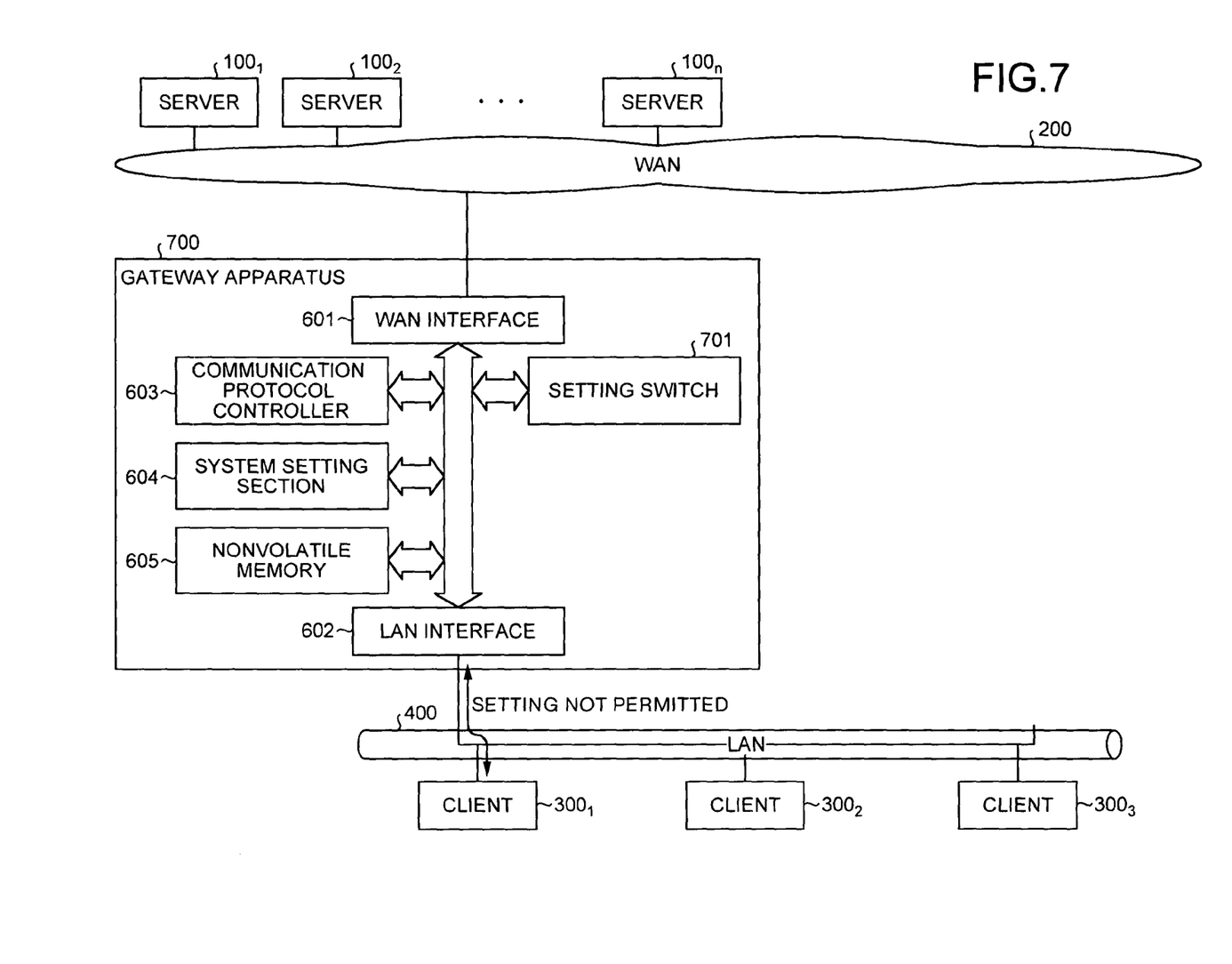
FIG. 7 is a block diagram of a configuration according to a third embodiment of the present invention.

FIG. 7 is a block diagram of the configuration according to the third embodiment of the present invention. In this figure, the parts corresponding to the respective sections in FIG. 4 are denoted by the same reference signs, and the explanation thereof is omitted.

In FIG. 7, a gateway apparatus 700 is provided instead of the gateway apparatus 600 shown in FIG. 4. In the gateway apparatus 700, a setting switch 701 is newly provided.

The gateway apparatus 700 is a gateway dedicated apparatus installed, for example, in home, that provides a function as a (home) gateway (for example, a router function, a bridge function, and the like), and is inserted between the WAN 200 and the LAN 400 having different communication protocols from each other.

The gateway apparatus 700 is an apparatus that enables interconnection, by adjusting the difference in the communication protocol between the WAN 200 and the LAN 400.

In using the gateway apparatus 700, the system data explained in the first embodiment must be set. Generally, at the time of shipping the gateway apparatus 700 from the factory, the system data is initialized by default.

The administrator of the gateway apparatus 700 individually sets any necessary system data of the system data, when using the gateway apparatus 700.

The setting switch 701 is a switch pressed by the administrator at the time of setting the system data. The gateway apparatus 700 is constructed such that the system data cannot be set unless the setting switch 701 is pressed.

The third embodiment is constructed to give control authority as a control terminal is given, for example, to the client $300_1$ of the clients $300_1$ to $300_3$ connected to the LAN 400 so that only the client $300_1$ can perform setting (including initialization, modification, restoration, and storage) of the system data, after the setting switch 701 is pressed by the administrator.

Therefore, the other clients $300_2$ and $300_3$ cannot perform setting of the system data for the gateway apparatus 700.

The operation of the third embodiment is explained below with reference to the flowchart shown in FIG. 8. An example of setting (including initialization, modification, restoration, and storage) the system data for the gateway apparatus 700 is explained below.

Figure 8:
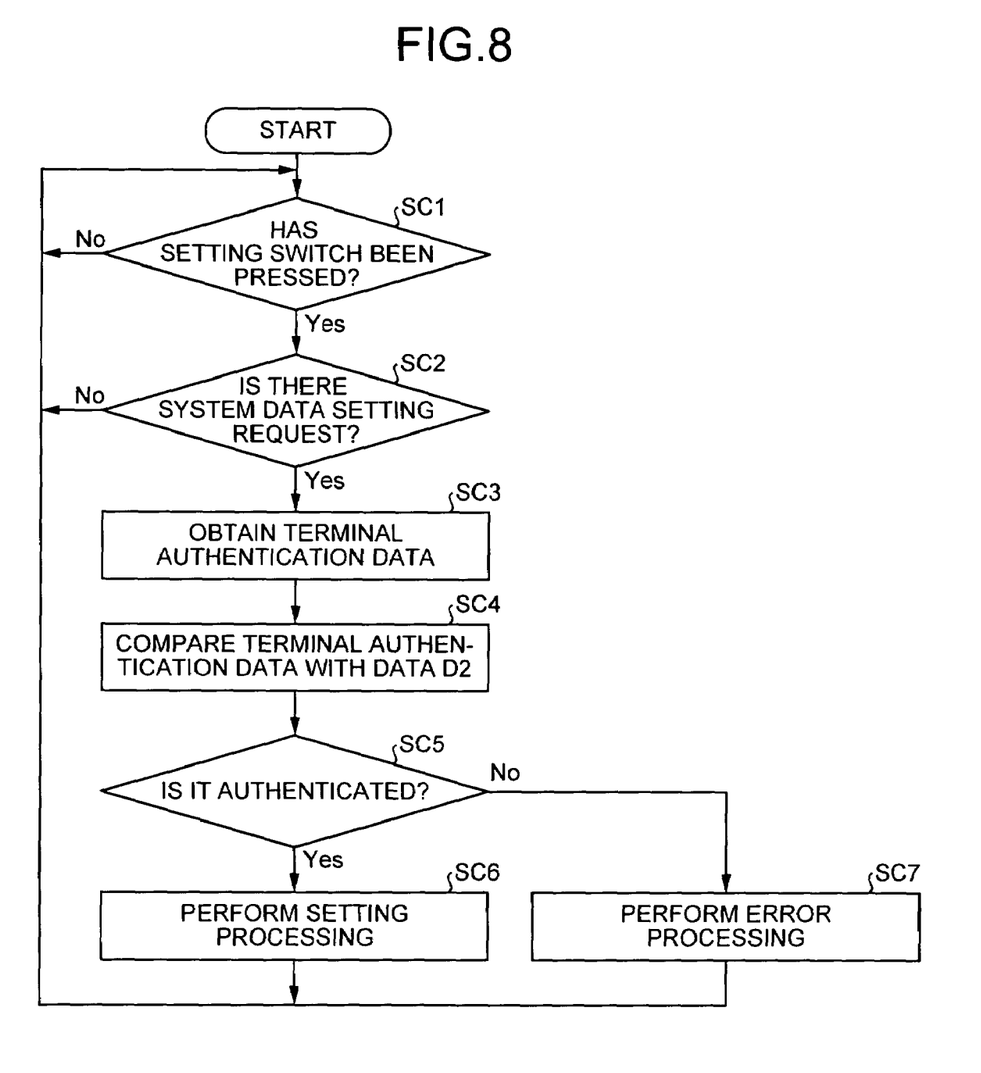
FIG. 8 is a flowchart of the operation of the third embodiment.

At step SC1 of FIG. 8, the system data setting section 604 determines whether the setting switch 701 has been pressed, makes a "No" determination in this case, and repeats processing of the determination.

The administrator presses the setting switch 701 for setting the system data of the gateway apparatus 700. Thereby, the system data setting section 604 makes a "Yes" determination at step SC1.

At step SC2, the system data setting section 604 determines whether there is a system data setting request (including initialization, modification, restoration, and storage) of the gateway apparatus 700 from an external terminal (in this case, clients $300_1$ to $300_3$). In this case, the system data setting section 604 makes a "No" determination at step SC2, and repeats processing of the determination at steps SC1 and SC2.

The administrator inputs an instruction for setting the system data in the input section (not shown) of the client $300_1$. Thereby, the client $300_1$ issues a system data setting request to the system data setting section 604 in the gateway apparatus 700, via the LAN 400 and the LAN interface 602.

As a result, the system data setting section 604 makes a "Yes" determination at step SC2. At step SC3, the system data setting section 604 requests terminal authentication data to the client $300_1$, and obtains the terminal authentication data stored in the ROM (not shown).

The terminal authentication data obtained from the client $300_1$ includes product name data (product name symbol, product name data length, product name checksum, and product name), and serial number data (serial number symbol, serial number data length, serial number checksum, and serial number).

At step SC4, the system data setting section 604 reads the terminal authentication data D2 (see FIG. 5) from the nonvolatile memory 605, and compares the terminal authentication data D2 with the terminal authentication data corresponding to the client $300_1$ obtained at step SC3.

At step SC5, the system data setting section 604 determines whether the client $300_1$ is authenticated as the control terminal provided with the control authority (whether there is a match between the data) based on the comparison result made at step SC5, and makes a "Yes" determination in this case.

At step SC6, the system data setting section 604 sets the system data (including initialization, modification, restoration, and storage) in the nonvolatile memory 605 in response to the system data setting request from the client $300_1$, and performs determination at step SC1. During setting processing at step SC6, the gateway function is temporarily suspended.

When another user presses the setting switch 701 and inputs an instruction for setting the system data in the input section (not shown) of the client $300_2$, the client $300_2$ issues a system data setting request to the system data setting section 604 via the LAN 400 and the LAN interface 602.

Thereby, the system data setting section 604 makes a "Yes" determination at step SC1 and step SC2, respectively. At step SC3, the system data setting section 604 requests terminal authentication data to the client $300_2$ and obtains the terminal authentication data stored in the ROM (not shown).

The terminal authentication data obtained from the client $300_2$ includes product name data (product name symbol, product name data length, product name checksum, and product name), and serial number data (serial number symbol, serial number data length, serial number checksum, and serial number).

At step SC4, the system data setting section 604 reads the terminal authentication data D2 (see FIG. 5) from the nonvolatile memory 605, and compares the terminal authentication data D2 with the terminal authentication data corresponding to the client $300_2$ obtained at step SC3.

At step SC5, the system data setting section 604 determines whether the client $300_2$ is authenticated as the control terminal provided with the control authority (whether there is a match between the data) based on a comparison result made at step SC4. In this case, the system data setting section 604 determines that both pieces of the terminal authentication data fail to match as the comparison result, and makes a "No" determination at step SC5.

At step SC7, the system data setting section 604 performs error processing, that is, informs the client $300_2$ of "error" indicating that the setting is not permitted, and then performs the determination at step SC1. In other words, in this case, the client $300_2$ (also client $300_3$) does not have the control authority, and therefore the system data setting section 604 does not permit the setting of the system data for the gateway apparatus 700.

As explained above, according to the third embodiment, after the setting switch 701 has been pressed, the permission for setting of the system data is determined. As a result, erroneous setting of the system data can be prevented.

The first to the third embodiments of the present invention have been explained in detail with reference to the drawings. However, the example of specific configuration is not limited to the embodiments, and any design changes without departing from the scope of the present invention are included in the present invention.

Figure 9:
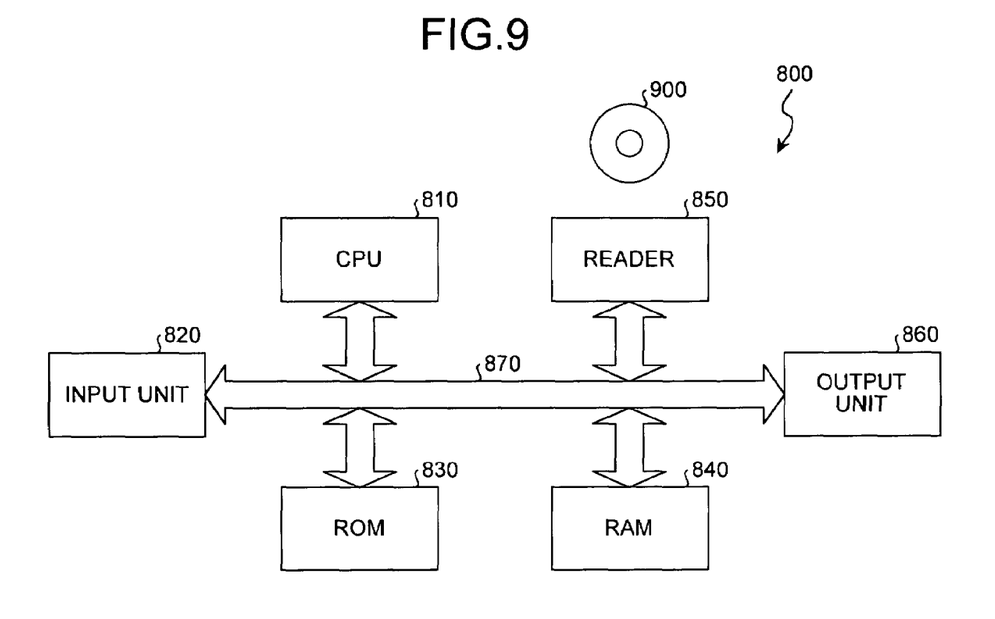
FIG. 9 is a block diagram of a modification according to the first to third embodiments of the present invention.

For example, in the first to the third embodiments, a program for implementing the functions of the gateway card 510 (see FIG. 1), the gateway apparatus 600 (see FIG. 4), and the gateway apparatus 700 (see FIG. 7) may be recorded in a computer readable recording medium 900 shown in FIG. 9, and the computer program recorded in the recording medium 900 may be read and executed by a computer 800 shown in FIG. 9, to thereby implement the respective functions.

The computer 800 includes a CPU 810 that executes the computer program, an input device 820 such as a keyboard and a mouse, a ROM 830 that stores various data, a RAM 840 that stores arithmetic parameters and the like, a reader 850 that reads the computer program from the recording medium 900, an output device 860 such as a display and a printer, and a bus 870 that connects the respective sections in the apparatus.

The CPU 810 reads the computer program recorded in the recording medium 900 via the reader 850, and executes the computer program to implement the functions. The recording medium 900 includes an optical disk, a flexible disk, a hard disk, and the like.

In the first embodiment, the construction may be such that a setting switch similar to the setting switch 701 (see FIG. 7) is provided in the gateway card 510 (see FIG. 1), and setting of the system data is performed by a personal computer 520 in the same manner as in the third embodiment, under condition that the setting switch is pressed.

In the first to the third embodiments, an example in which the product name data and the serial number data are used as the terminal authentication data is explained. However, the terminal authentication data is not limited to the product name data and the serial number data, and the Media Access Control (MAC) address or the like may be used if it is the data for authenticating the gateway personal computer and the client as the control terminal.

As explained above, according to one aspect of the present invention, the first apparatus authentication data retained in advance is compared with the second apparatus authentication data obtained from the client information processor having issued the system data setting request of the gateway card. Only if there is a match between both of the data as a result of the comparison, setting of the system data is permitted. Therefore, even in an environment like home where an administrator having no expertise performs the setting, it is possible to prevent setting from changing due to operational error or misunderstanding or setting of system data by a malicious third party, thereby enabling improvement in the user convenience.

Furthermore, since it is most effective against invasion from outside to maintain the setting of the network or the like normal, it is possible to increase safety by establishing the connection with the outside only when it is necessary. It is also possible to easily perform setting and to construct such an environment that the setting contents are hard to be destroyed.

Moreover, only when the gateway card is inserted into the server information processor, it is determined whether the permission is given. Therefore, setting of the system data by a malicious third party via the network can be perfectly prevented in the state where the gateway card is not inserted.

Furthermore, after the setting switch has been pressed, it is determined whether setting of the system data is permitted. Therefore, erroneous setting of the system data can be prevented.

Moreover, since the first apparatus authentication data includes the product name data and the serial number data, setting of the system data by a malicious third party can be effectively prevented even in the environment like home where an administrator having no expertise performs the setting.

Furthermore, the first apparatus authentication data retained in advance is compared with the second apparatus authentication data obtained from a client information processor having issued the system data setting request of the gateway apparatus. Only if there is a match between both of the data as a result of the comparison, the setting of the system data is permitted. Therefore, even in the environment like home where an administrator having no expertise performs the setting, it is possible to prevent changing of setting due to operational error or misunderstanding or to prevent setting of system data by a malicious third party, thereby enabling improvement in the user convenience.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A gateway card that is detachably inserted into a server information processor and controls communications between different networks, the gateway card comprising:
    a retention unit that retains first apparatus authentication data for authenticating the server information processor;
    a setting request reception unit that receives a setting request for system data in the gateway card;
    a data obtaining unit that obtains second apparatus authentication data from either of a client information processor and the server information processor which has issued the setting request; and
    a permission unit that compares the first apparatus authentication data with the second apparatus authentication data, and permits setting of the system data only if there is a match between both of the data as a result of the comparison.

2. The gateway card according to claim 1, wherein the permission unit makes a determination on the permission only when the gateway card is in the server information processor.

3. The gateway card according to claim 2, further comprising a setting switch, wherein the permission unit makes a determination on the permission if the setting switch is operated.

4. The gateway card according to claim 1, wherein the first apparatus authentication data includes data for a product name and data for a serial number.

5. A gateway control method used for a gateway card that is detachably inserted into a server information processor and controls communications between different networks, the method comprising:
    retaining first apparatus authentication data for authenticating the server information processor;
    receiving a setting request for system data in the gateway card;
    obtaining second apparatus authentication data from either of a client information processor and the server information processor which has issued the setting request; and
    comparing the first apparatus authentication data with the second apparatus authentication data, and permitting setting of the system data only if there is a match between both of the data as a result of the comparison.

6. The gateway control method according to claim 5, wherein the comparing includes comparing both the data only when the gateway card is in the server information processor.

7. The gateway control method according to claim 6, further comprising outputting a command to start the comparing, wherein the comparison of both the data is performed when the command is output.

8. The gateway control method according to claim 5, wherein the first apparatus authentication data includes data for a product name and data for a serial number.

9. A gateway apparatus that performs communication control between different networks, the gateway apparatus comprising:
    a retention unit that retains first apparatus authentication data for authenticating a server information processor;
    a setting request reception unit that receives a setting request for system data in the gateway apparatus;
    a data obtaining unit that obtains second apparatus authentication data from either of a client information processor and the server information processor which has issued the setting request; and a permission unit that compares the first apparatus authentication data with the second apparatus authentication data, and permits setting of the system data only if there is a match between both of the data as a result of the comparison.

10. The gateway apparatus according to claim 9, further comprising a setting switch, wherein the permission unit makes a determination on permission if the setting switch is operated.

11. The gateway apparatus according to claim 9, wherein the first apparatus authentication data includes data for a product name and data for a serial number.

12. A gateway control method used for controlling communications between different networks, the method comprising:
- retaining first apparatus authentication data for authenticating the server information processor;
- receiving a setting request for system data in the gateway apparatus;
- obtaining second apparatus authentication data from either of a client information processor and the server information processor which has issued the setting request; and
- comparing the first apparatus authentication data with the second apparatus authentication data, and permitting setting of the system data only if there is a match between both of the data as a result of the comparison.

13. The gateway control method according to claim 12, further comprising outputting a command to start the comparing, wherein the comparison of both the data is performed when the command is output.

14. The gateway control method according to claim 12, wherein the first apparatus authentication data includes data for a product name and data for a serial number.

15. A gateway control program for controlling communications between different networks, the computer program allowing a computer to execute:
- retaining first apparatus authentication data for authenticating the server information processor;
- receiving a setting request for system data in the gateway apparatus;
- obtaining second apparatus authentication data from either of a client information processor and the server information processor which has issued the setting request; and
- comparing the first apparatus authentication data with the second apparatus authentication data, and permitting setting of the system data only if there is a match between both of the data as a result of the comparison.

16. The gateway control program according to claim 15, further comprising outputting a command to start the comparing, wherein the comparison of both the data is performed when the command is output.

17. The gateway control program according to claim 15, wherein the first apparatus authentication data includes data for a product name and data for a serial number.

* * * * *